(12) United States Patent
Iura et al.

(10) Patent No.: US 8,305,629 B2
(45) Date of Patent: Nov. 6, 2012

(54) METHOD AND APPARATUS FOR FORMING IMAGE AND RECORDING MEDIUM

(75) Inventors: Saori Iura, Tokyo (JP); Yasuyuki Igarashi, Kanagawa (JP); Masateru Kumagai, Kanagawa (JP); Daisuke Okada, Saitama (JP)

(73) Assignee: Ricoh Company, Limited, Tokyo (JP)

( * ) Notice: Subject to any disclaimer, the term of this patent is extended or adjusted under 35 U.S.C. 154(b) by 695 days.

(21) Appl. No.: 12/475,773

(22) Filed: Jun. 1, 2009

(65) Prior Publication Data

US 2009/0310182 A1 Dec. 17, 2009

(30) Foreign Application Priority Data

Jun. 13, 2008 (JP) ................. 2008-155407

(51) Int. Cl.
*G06F 15/00* (2006.01)
*G08B 23/00* (2006.01)

(52) U.S. Cl. ...................... 358/1.18; 340/502

(58) Field of Classification Search ............... 358/1.18
See application file for complete search history.

(56) References Cited

U.S. PATENT DOCUMENTS

| 7,707,228 B2 * | 4/2010 | Kawai ...................... 707/802 |
| 2008/0309967 A1 * | 12/2008 | Ferlitsch et al. ............ 358/1.15 |

FOREIGN PATENT DOCUMENTS

| JP | 5-16497 | 1/1993 |
| JP | 11-321030 | 11/1999 |
| JP | 2008-219416 | 9/2008 |

\* cited by examiner

*Primary Examiner* — Saeid Ebrahimi Dehkordy
(74) *Attorney, Agent, or Firm* — Oblon, Spivak, McClelland, Maier & Neustadt, L.L.P.

(57) ABSTRACT

One or more among a PC document receive filter, a FAX document receive filter, a read filter, and a readout filter create a report on each of the corresponding functions in a format common to the functions. A report filter changes a format of the created report as desired by the user. Therefore, when a setting for a report output process is changed, it is not necessary to change the setting with respect to each of the functions. Thus, it is possible to reduce development man-hours for the report output process.

15 Claims, 17 Drawing Sheets

```
<?xml version="1.0" encoding="UTF-8"?>
<platform>
```
- 301 — `<header>`
- 302 — `<name>XXXXX report</name>`
- 303 — `</header>`
- 304 — `<body>`
- 305 — `<status_label>equipment status</status_label>`
- 306 — `<status>error</status>`
- 307 — `</body>`

```
<footer/>
</platform>
```

```
<?xml version="1.0" encoding="UTF-8"?>
<xsl:stylesheet version="1.0"
 xmlns:xsl="http://www.w3.org/1999/XSL/Transform"
 xmlns:xalan="http://xml.apache.org/xslt">
<xsl:import href="platform.xsl"/>
<xsl:output method="xml" encoding="UTF-8"/>

<xsl:template match="/">
  <xsl:apply-templates/>
</xsl:template>
```

```
401  <xsl:template match="body">
402   <xsl:element name="body">
403    <xsl:element name="report.box">
404     <xsl:attribute name="x">100</xsl:attribute>
405     <xsl:attribute name="y">100</xsl:attribute>
406     <xsl:attribute name="ex">800</xsl:attribute>
407     <xsl:attribute name="ey">400</xsl:attribute>
408    </xsl:element>

409    <xsl:element name="report.string">
410     <xsl:attribute name="x">100</xsl:attribute>
411     <xsl:attribute name="y">100</xsl:attribute>
412     <xsl:value-of select="status_label"/>
413    </xsl:element>

414    <xsl:element name="report.string">
415     <xsl:attribute name="x">1000</xsl:attribute>
416     <xsl:attribute name="y">100</xsl:attribute>
417     <xsl:value-of select="status"/>
418    </xsl:element>
419   </xsl:element>
420  </xsl:template>
</xsl:stylesheet>
```

FIG. 5

```
<?xml version="1.0" encoding="UTF-8"?>
<xsl:stylesheet version="1.0"
  xmlns:xsl="http://www.w3.org/1999/XSL/Transform"
  xmlns:xalan="http://xml.apache.org/xslt"
  >
```

- 501 — `<xsl:template match="header">`
- 502 — `<xsl:element name="header">`
- 503 — `<xsl:element name="report.string">`
- 504 — `<xsl:attribute name="x">100</xsl:attribute>`
- 505 — `<xsl:attribute name="y">100</xsl:attribute>`
- 506 — `<xsl:value-of select="name"/>`
- 507 — `</xsl:element>`
- 508 — `<xsl:element name="report.string">`
- 509 — `<xsl:attribute name="x">2000</xsl:attribute>`
- 510 — `<xsl:attribute name="y">500</xsl:attribute>`
- 511 — `<xsl:attribute name="output">date</xsl:attribute>`
- 512 — `</xsl:element>`
- 513 — `</xsl:element>`
- 514 — `</xsl:template>`

`</xsl:stylesheet>`

FIG. 6

| TAG | SUMMARY | ATTRIBUTE | MANDATORY ATTRIBUTE | EXPLANATION OF ATTRIBUTE |
|---|---|---|---|---|
| header | HEADER AREA | | | |
| body | BODY AREA | | | |
| list | DRAWING OF TABLE | width | ✓ | SPECIFY WIDTH [mm] OF EACH ITEM IN TABLE BY COMMA-SEPARATED VALUES |
| | | x | | START POSITION [mm] |
| | | y | | START POSITION [mm] |
| | | border | | SPECIFY DIAMETER OF TIP OF PEN USED TO DRAW FRAME BORDER (ENABLE TO SPECIFY IN SAME MANNER AS size ATTRIBUTE IN SPECIFICATION OF PEN) |
| line | DRAWING OF LINE | | | |
| page | SPECIFICATION OF PAGE | | | |
| offset | OFFSET | size | ✓ | OFFSET SIZE [mm] UP TO SUBSEQUENT LINE |

FIG. 7

| TAG | SUMMARY | ATTRIBUTE | MANDATORY ATTRIBUTE | EXPLANATION OF ATTRIBUTE |
|---|---|---|---|---|
| report. string | WRITE CHARACTER STRING | x | | LATERAL START POINT OF CHARACTER STRING |
| | | y | | VERTICAL START POINT OF CHARACTER STRING |
| | | output | | SPECIFY OUTPUT DATA OUTPUT TODAY'S DATE IN yyyy/MM/dd FORMAT |
| report. box | DRAW BOX | x | | LATERAL START POINT OF BOX [mm] |
| | | y | | VERTICAL START POINT OF BOX [mm] |
| | | ex | ✓ | LATERAL END POINT OF BOX [mm] |
| | | ey | ✓ | VERTICAL END POINT OF BOX [mm] |

FIG. 8

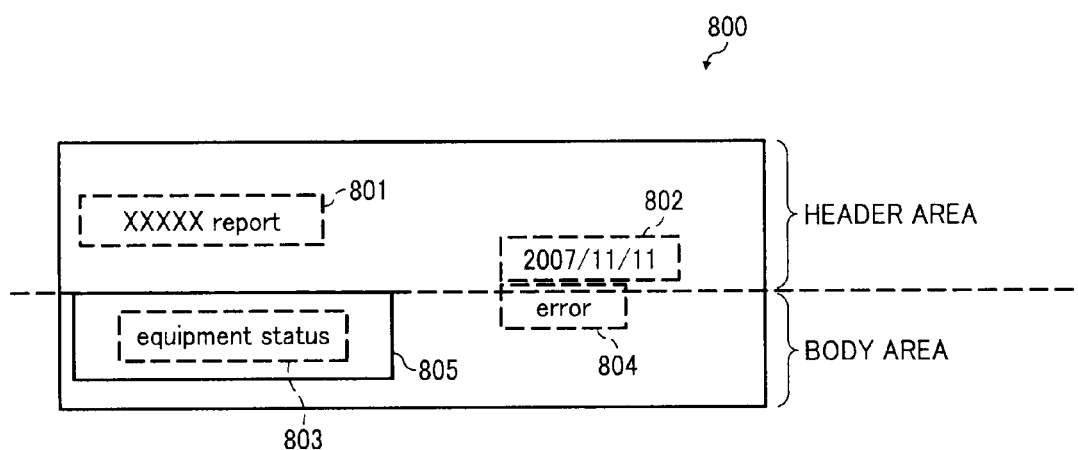

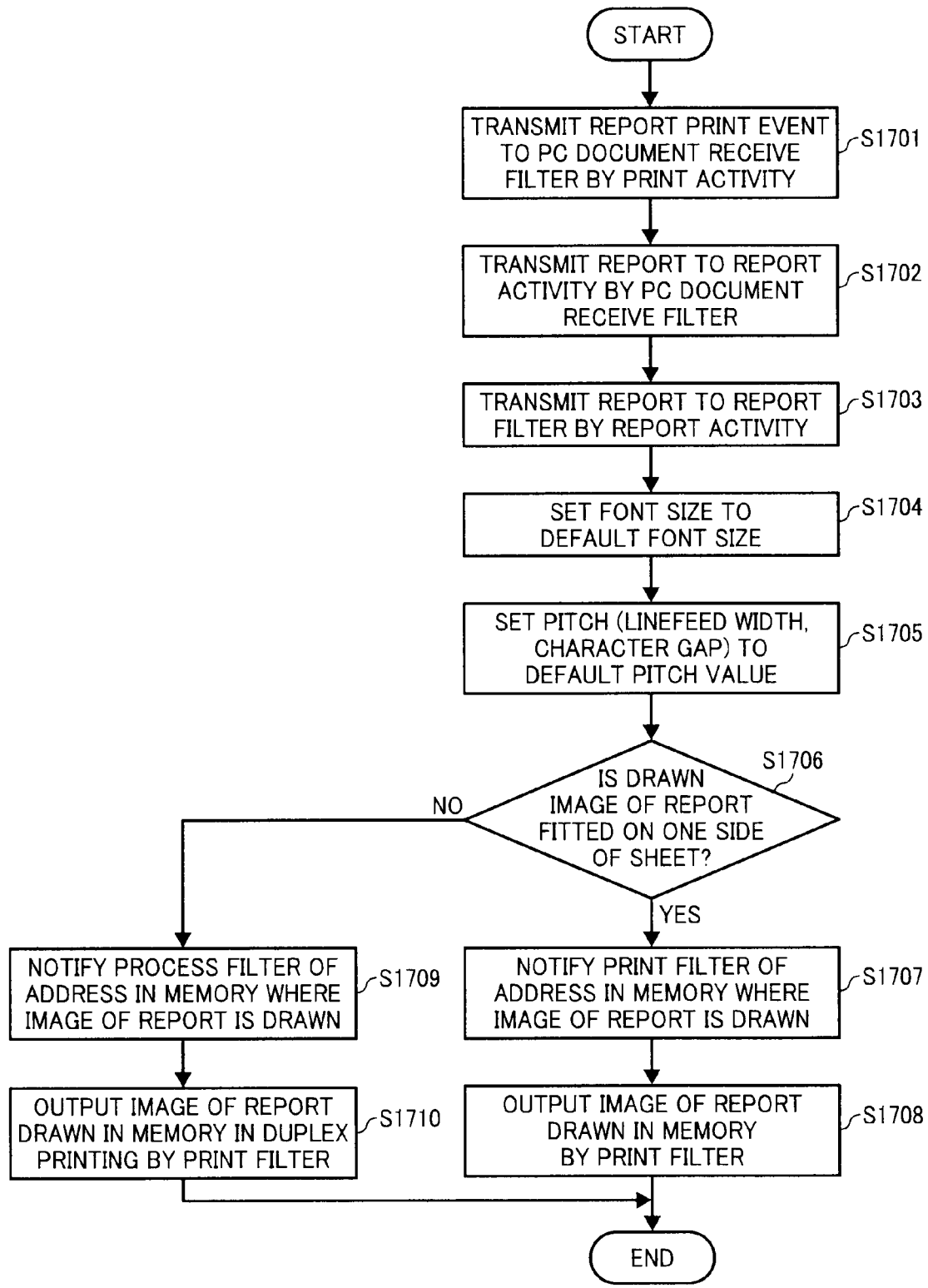

FIG. 18

| LANGUAGE ID/ LANGUAGE | JAPANESE | ENGLISH | FRENCH | RUSSIAN |
|---|---|---|---|---|
| ID_1 | 試し印刷文書 | Sample Print | Impression d'é preuve | Образец Печати |
| ID_2 | 機密印刷文書 | Locked Print | Impression sé curisée | Блокир.печать |
| ID_3 | 用紙設定 | Paper Input | Entrée papier | Влож.бум. |
| ID_4 | テスト印刷 | List/Test Print | Impr. liste/test | Печать Списка/Тест. |
| ID_5 | 調整/管理 | Maintenance | Maintenance | Обслуживание |
| ID_6 | システム設定 | System | Système | Система |
| ... | ... | ... | ... | ... |
| ID_100 | インターフェース設定 | Host Interface | Interface hôte | Интерф.хоста |
| ... | ... | ... | ... | ... |
| ID_1000 | PCL メニュー | PCL Menu | Menu PCL | PCL Меню |

FIG. 19

```
                    <?xml version="1.0" encoding="UTF-8"?>
1901 ─────── <output_lang=JAPANESE>
                    <platform>
                    <header>
1902 ─────── <name>ID_7</name>
                    </header>
                    <body>
1903 ─────── <status_label>ID_77</status_label>
1904 ─────── <status>ID_777</status>
                    </body>
```

1900

METHOD AND APPARATUS FOR FORMING IMAGE AND RECORDING MEDIUM

CROSS-REFERENCE TO RELATED APPLICATIONS

The present application claims priority to and incorporates by reference the entire contents of Japanese priority document 2008-155407 filed in Japan on Jun. 13, 2008.

BACKGROUND OF THE INVENTION

1. Field of the Invention

The present invention relates to a technology for forming an image.

2. Description of the Related Art

An image forming apparatus called a digital multifunction product (MFP) includes various functions of a copier, a facsimile machine (FAX), a scanner, a printer, and the like. The MFP generally outputs a report (or a sheet) on each of the functions so as to inform a user of a status of equipment, a usage status, and the like. As types of reports on the functions, there are a report on set-value information or the like (hereinafter, "a summary sheet"), a report on an error history or the like (hereinafter, "an error sheet"), a report on the number of sheets used by a user or the like (hereinafter, "a counter sheet"), a report on a remaining toner amount or the like (hereinafter, "a supply information sheet"), and the like.

For example, Japanese Patent Application Laid-open No. H05-016497 discloses a printer capable of creating a simple and straightforward setting list including information on all printing control settings and information on current settings. Specifically, the printer prints out all settable information (operation parameters) in a list form so that a user can read the report legibly. Furthermore, the printer prints out currently-set information (current values) in a highlighted manner to become more prominent than other information. Such setting information can be output by a typical image forming apparatus such as a copier, a FAX, an MFP, and the like.

However, when contents of a report (for example, a format of the report, a content of a character string to be listed on the report, and the like) are fixed in advance, there are particular problems as follows.

For example, when an administrator of an MFP wants to change a format of a report, the administrator must change settings of all report output units included in functions, such as a copier function, a FAX function, a scanner function, and a printer function. Therefore, it takes reasonable development man-hours (time and effort). Furthermore, the administrator needs to reflect almost the same content to change the format in each of the functions.

SUMMARY OF THE INVENTION

It is an object of the present invention to at least partially solve the problems in the conventional technology.

According to an aspect of the present invention, there is provided an image forming apparatus capable of outputting function information on each of a plurality of functions. The image forming apparatus includes a plurality of creating units that create the function information in a format common to the functions; a changing unit that changes the format of the function information created by one or more of the creating units; and an output unit that outputs the function information whose format is changed by the changing unit.

According to another aspect of the present invention, there is provided an image forming method for causing an image forming apparatus to output function information on each of a plurality of functions. The image forming method including creating the function information in a format common to the functions; changing the format of the function information created at the creating; and outputting the function information whose format is changed at the changing.

According to still another aspect of the present invention, there is provided a computer-readable recording medium that stores therein a computer program which when executed on a computer causes the computer to output function information on each of a plurality of functions. The computer program causing the computer to execute creating the function information in a format common to the functions; changing the format of the function information created at the creating; and outputting the function information whose format is changed at the changing.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is an explanatory diagram of an example of report information;

FIG. 4 is an explanatory diagram of an example of a report format;

FIG. 5 is an explanatory diagram of an example of a common format;

FIG. 6 is a table showing an example of control tags included in the report information, the report format, and the common format;

FIG. 7 is a table showing an example of image tags included in the report information, the report format, and the common format;

FIG. 8 is an explanatory diagram of an example of an image of a report drawn in a memory based on an analysis of the report information, the report format, and the common format shown in FIGS. 3 to 5;

FIG. 17 is a flowchart of a report printing process performed by components of an MFP according to a fourth embodiment of the present invention;

FIG. 18 is a schematic diagram of an example of an output language file;

FIG. 19 is an explanatory diagram of an example of report information; and

DETAILED DESCRIPTION OF THE PREFERRED EMBODIMENTS

Exemplary embodiments of the present invention are explained in detail below with reference to the accompanying drawings. In the embodiments described below, the present invention is applied to an MFP as an example of an image forming apparatus. However, the present invention can be applied to devices other than the MFP. The present invention can be applied to different types of image forming apparatuses, such as a copier, a printer, and a FAX, as long as the image forming apparatuses have a plurality of functions. Incidentally, the MFP according to the embodiments shall have a printer function of printing data on a recording medium such as a sheet; a FAX function of sending/receiving a fax; and a copier function of printing image data read by a scanner or image data stored in a storage medium.

Figure 1:
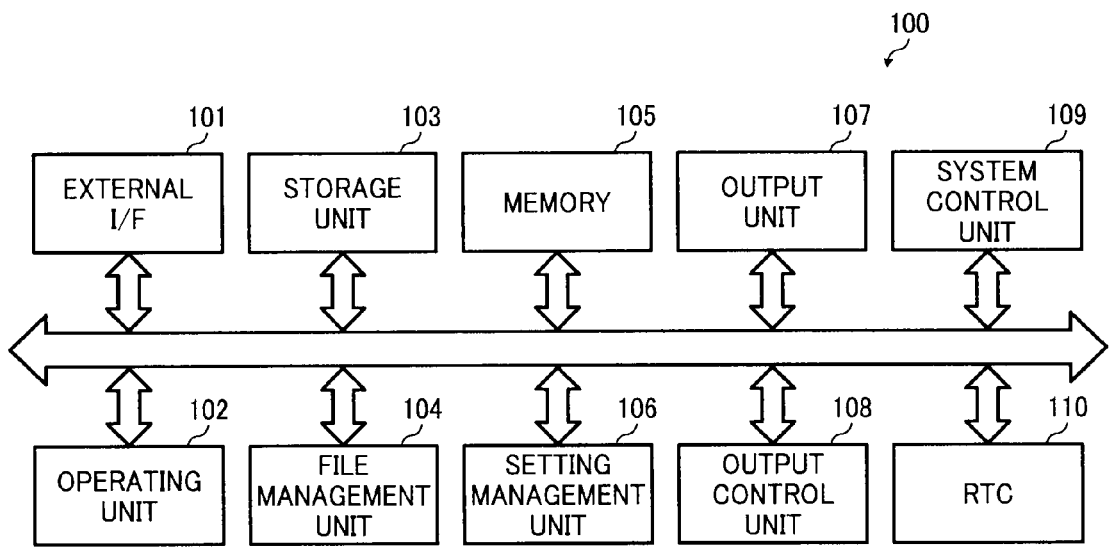
FIG. 1 is a block diagram of an MFP according to a first embodiment of the present invention.

FIG. 1 is a block diagram of an MFP 100 according to a first embodiment of the present invention. As shown in FIG. 1, the MFP 100 includes an external interface (I/F) 101, an operating unit 102, a storage unit 103, a file management unit 104, a memory 105, a setting management unit 106, an output unit 107, an output control unit 108, a system control unit 109, and an RTC 110. The MFP 100 is connected to a network such as the Internet via the external I/F 101. When receiving image data from an external personal computer (PC) (not shown) via the external I/F 101, the MFP 100 performs image processing on the received image data, and outputs the processed image data as a printed material.

The external I/F 101 exchange data, such as image data or control data, with an external PC (not shown) via the network such as a local area network (LAN) or the Internet.

The operating unit 102 detects an input of a setting, which is input by a user via a touch panel (not shown) thereof. In the present embodiment, the operating unit 102 receives an input of a request for an output of a report on each of the functions included in the MFP 100 or an input of a setting value with respect to each of the functions. Furthermore, the operating unit 102 displays a preview screen or a setting screen on the touch panel as a display means. A user can input a setting value through the setting screen.

The storage unit 103 includes a random access memory (RAM) (not shown), and stores therein information to be listed on a report. In the present embodiment, the storage unit 103 stores therein set values of the functions, an error history of errors occurred in each of the functions, a language file including character strings to be listed on a report on each of the functions, and the like.

The memory 105 includes a RAM, and stores therein image data received from an external device via the external I/F 101, a drawn image of image data, and the like.

The file management unit 104 controls storage of information in the storage unit 103. In the present embodiment, the file management unit 104 stores a setting value received by the operating unit 102, an error history, and the like in the storage unit 103.

The RTC 110 is a real-time clock having a clock function and a calendar function.

The output unit 107 outputs a report, image data, and the like. In the present embodiment, the output unit 107 is a plotter, and prints out a report, an image of image data, or the like those drawn in the memory 105 on a recording medium. Incidentally, in the present embodiment, a plotter is used as the output unit 107. However, the output unit 107 is not limited to the plotter. For example, the output unit 107 can be configured to transmit a report, image data, or the like to, for example, an external PC (not shown) via the network or by fax, or store it in a main storage unit (not shown).

The setting management unit 106 acquires output information to be listed on a report from information stored in the storage unit 103, and also acquires date or the like from the RTC 110.

The output control unit 108 performs data processing and data control on a report to be output by the output unit 107 with the information acquired by the setting management unit 106, such as the output information and the date. Furthermore, the output control unit 108 performs data processing and data control on image data to be output by the output unit 107.

The system control unit 109 is connected to the above units, and controls the entire MFP 100.

The setting management unit 106, the output control unit 108, and the system control unit 109 are composed of a central processing unit (CPU) (not shown), a read-only memory (ROM) (not shown), a RAM (not shown), and the like. The CPU operates based on a computer program stored in the ROM by using a working area of the RAM, and thereby executing a process.

The computer program executed by the MFP 100 can be stored in a computer-readable recording medium, such as a compact disk ROM (CD-ROM), a flexible disk (FD), a CD recordable (CD-R), or a digital versatile disk (DVD), in an installable or executable file format. In this case, the CPU reads out the computer program from the recording medium, and loads the computer program onto a main storage unit (not shown) thereby causing the MFP 100 to realize the functions. Furthermore, the computer program can be stored on a computer connected to a network such as the Internet so that the MFP 100 can download the computer program via the network. Moreover, the computer program can be provided or distributed via a network such as the Internet.

Figure 2:
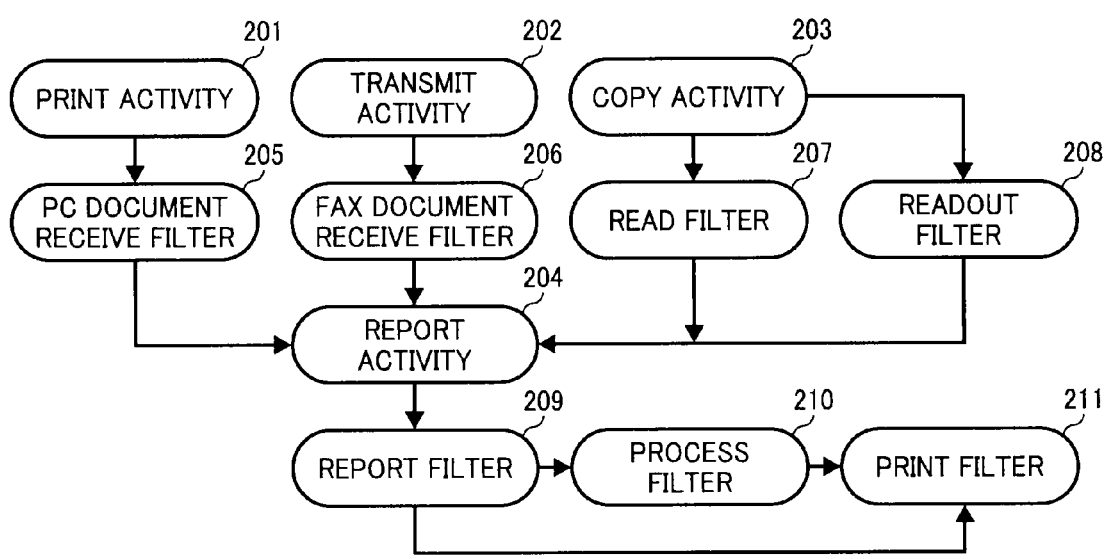
FIG. 2 is a component diagram for explaining a configuration of functions realized by a setting management unit, a system control unit, and an output control unit shown in FIG. 1.

Subsequently, characteristic operations of the setting management unit 106, the output control unit 108, and the system control unit 109 are explained below with reference to FIG. 2. FIG. 2 is a component diagram for explaining a configuration of the functions realized by the setting management unit 106, the output control unit 108, and the system control unit 109.

The system control unit 109 realizes a print activity 201, a transmit activity 202, a copy activity 203, and a report activity 204. The print activity 201 manages a print job. The transmit activity 202 manages a fax job. The copy activity 203 manages copy and scan jobs. The report activity 204 manages a report job.

The setting management unit 106 and the output control unit 108 realize a PC document receive filter 205, a FAX document receive filter 206, a read filter 207, and a readout filter 208. The setting management unit 106 and the output control unit 108 have a filter component that executes a job depending on a message from an activity component. In the present embodiment, the setting management unit 106 and the output control unit 108 have the PC document receive filter 205, the FAX document receive filter 206, the read filter 207, the readout filter 208, a report filter 209, a process filter 210, and a print filter 211.

The PC document receive filter 205 exchanges a message with the print activity 201. Furthermore, in response to a message from the print activity 201, the PC document receive filter 205 analyzes image data acquired from the network via the external I/F 101, and draws an image corresponding to the image data in the memory 105.

The FAX document receive filter 206 exchanges a message with the transmit activity 202. Furthermore, in response to a message from the transmit activity 202, the FAX document receive filter 206 analyzes image data acquired from the network via the external I/F 101 or image data read by the scanner, and draws an image corresponding to the image data in the memory 105.

The read filter 207 exchanges a message with the copy activity 203. Furthermore, in response to a message from the copy activity 203, the read filter 207 analyzes image data read by the scanner, and draws an image corresponding to the image data in the memory 105.

The readout filter 208 exchanges a message with the copy activity 203. Furthermore, in response to a message from the copy activity 203, the readout filter 208 analyzes image data stored in the memory 105, and draws an image corresponding to the image data in the memory 105.

The PC document receive filter 205, the FAX document receive filter 206, the read filter 207, and the readout filter 208 create a report on each of the functions in a format common to the printer function, the FAX function, and the copier function. In the present embodiment, the PC document receive filter 205, the FAX document receive filter 206, the read filter 207, and the readout filter 208 acquire output information from the storage unit 103, and create a report including report information written in Extensible Markup Language (XML), a report format written in Extensible Stylesheet Language (XSL), and a common format written in XSL based on the acquired output information. Furthermore, in the present embodiment, the PC document receive filter 205, the FAX document receive filter 206, the read filter 207, and the readout filter 208 transmit the created report to the report filter 209 via the report activity 204.

Details of the report information, the report format, and the common format those included in the report are explained below with reference to FIGS. 3 to 7. FIG. 3 is an explanatory diagram of an example of the report information. FIG. 4 is an explanatory diagram of an example of the report format. FIG. 5 is an explanatory diagram of an example of the common format. FIG. 6 is a table showing an example of control tags included in the report information, the report format, and the common format. FIG. 7 is a table showing an example of image tags included in the report information, the report format, and the common format.

First, explanation is given about the tags included in the report information, the report format, and the common format with reference to FIGS. 6 and 7.

As shown in FIG. 6, as the control tags, there are a "header" tag, a "body" tag, a "list" tag, a "line" tag, a "page" tag, and an "offset" tag. The "header" tag describes about a header area. The "body" tag describes about a body area. The "list" tag describes about drawing of a table. The "line" tag describes about drawing of a line. The "page" tag describes about specification of page. The "offset" tag describes about offset.

When an attribute of a control tag is set, an attribute name and a parameter of the attribute are written. In the present embodiment, for example, in the "list" tag, attributes whose names are "width", "x", "y", "border", and "size" are set. The "width" attribute indicates a width (in millimeters (mm)) of each item in the table to be drawn in accordance with the "list" tag. Incidentally, a parameter of the "width" attribute is a mandatory parameter in the "list" tag, and is specified by comma-separated values. The "x" and "y" attributes respectively indicate a start position (mm) of the table to be drawn in accordance with the "list" tag. The "border" attribute indicates a diameter of a tip of a pen used to draw a frame border of the table to be drawn in accordance with the "list" tag.

The "size" attribute indicates an offset size (mm) up to a subsequent line. Incidentally, a parameter of the "size" attribute is a mandatory parameter in the "offset" tag.

As shown in FIG. 7, as the image tags, there are a "report.string" tag and a "report.box" tag. The "report.string" tag describes about writing of a character string. The "report.box" tag describes about drawing of a box.

When an attribute of an image tag is set, in the same manner as the control tag, an attribute name and a parameter of the attribute are written. In the present embodiment, in the "report.string" tag, attributes whose names are "x", "y", and "output" are set. The "x" and "y" attributes respectively indicate a lateral start point and a vertical start point of the character string written in accordance with the "report.string" tag. The "output" attribute specifies output data (the character string) written in accordance with the "report.string" tag. In this example, the "output" attribute specifies an output of a today's date as a report output date in the yyyy/MM/dd format.

Furthermore, in the "report.box" tag, attributes whose names are "x", "y", "ex", and "ey" are set. The "x" and "y" attributes respectively indicate a lateral start point and a vertical start point of the box drawn in accordance with the "report.box" tag. The "ex" and "ey" attributes respectively indicate a lateral extreme point and a vertical extreme point of the box drawn in accordance with the "report.box" tag. Incidentally, parameters of the "ex" and "ey" attributes are mandatory parameters in the "report.box" tag.

Subsequently, report information written in accordance with the above tags is explained in detail below. The report information is data defining a character string to be listed on a report. In the present embodiment, the PC document receive filter 205, the FAX document receive filter 206, the read filter 207, and the readout filter 208 create report information 300 defining a character string to be listed on a report in XML as shown in FIG. 3.

In the report information 300, a <header> tag 301 indicates a character string to be output to a header area. A <name>XXXXX report</name> tag 302 indicates that the character string to be output to the header area is "XXXXX report". A </header> tag 303 indicates the end of the character string to be output to the header area.

A <body> tag 304 indicates a character string to be output to a body area. A <status_label> equipment status</status_label> tag 305 and a <status> error</status> tag 306 indicate that character strings to be output to the body area are "equipment status" and "error". A </body> tag 307 indicates the end of the character strings to be output to the body area.

Subsequently, a report format written in accordance with the above tags is explained in detail below. The report format is data defining formats by each of types of reports. In the present embodiment, the PC document receive filter 205, the FAX document receive filter 206, the read filter 207, and the readout filter 208 create a report format 400 defining formats of each type of report in XSL as shown in FIG. 4.

An <xsl:template match="body"> tag 401 indicates that a body area is to be formatted. An <xsl:element name="body"> tag 402 indicates that an object to be formatted is the body area. An <xsl:element name="report.box"> tag 403 indicates that a box is to be drawn in the body area. In this example, the tag including "felement name" is a tag identifying an element to be formatted (for example, "header", "body", "report.box", or "report.string"). An <xsl:attribute name="x">100</xsl:attribute> tag 404 and an <xsl:attribute name="y">100</xsl:attribute> tag 405 respectively indicate a drawing start point (mm) of the box to be drawn in the body area. An <xsl: attribute name="ex">800</xsl:attribute> tag 406 and an <xsl:attribute name="ey">400</xsl:attribute> tag 407 respectively indicate a drawing end point (mm) of the box to be drawn in the body area. In this example, the tag including "attribute name" is in a parent-child relationship with the tag including "element name", and is a tag identifying a content of processing indicated by the tag including "element name". Incidentally, the number of types of the tags including "attribute name" is identical to the number of types of contents of processing indicated by the tags including "element name". A </xsl:element> tag 408 indicates the end of the drawing of the box in the body area.

An <xsl:element name="report.string"> tag 409 indicates that a character string is to be written in the body area. An <xsl:attribute name="x">100</xsl:attribute> tag 410 and an <xsl:attribute name="y">100</xsl:attribute> tag 411 respectively indicate a start point (mm) of the character string to be written in the body area. An <xsl:value-of select="status_label"/> tag 412 indicates the character string to be written in the body area. Specifically, the <xsl:value-of select="status_label"/> tag 412 indicates that the character string "equipment status" corresponding to "status_label" is acquired from the report information 300 shown in FIG. 3, and output. In this example, the tag including "value-of select" is in a parent-child relationship with the tag including "attribute name", and is a tag identifying a content of processing indicated by the tag including "attribute name". Incidentally, the number of types of the tags including "value-of select" is identical to the number of types of contents of processing indicated by the tags including "attribute name". A </xsl:element> tag 413 indicates the end of the character string to be written in the body area.

An <xsl:element name="report.string"> tag 414 indicates that a character string is to be written in the body area. An <xsl:attribute name="x">1000</xsl:attribute> tag 415 and an <xsl:attribute name="y">100</xsl:attribute> tag 416 respectively indicate a start point (mm) of the character string to be written in the body area. An <xsl:value-of select="status"/> tag 417 indicates the character string to be written in the body area. Specifically, the <xsl:value-of select="status"/> tag 417 indicates that the character string "error" corresponding to "status" is acquired from the report information 300 shown in FIG. 3, and output. A </xsl:element> tag 418 indicates the end of the writing of the character string in the body area. A </xsl:element> tag 419 indicates the end of the body area as an object to be formatted. A </xsl:template> tag 420 indicates the end of the formatting of the body area.

Subsequently, a common format written in accordance with the above tags is explained in detail below. The common format is data defining a format common to reports on the functions, such as a position of a header in a report, a report output date and time, and the like. In the present embodiment, the PC document receive filter 205, the FAX document receive filter 206, the read filter 207, and the readout filter 208 create a common format 500 defining a format common to reports on the functions in XSL as shown in FIG. 5.

An <xsl:template match="header"> tag 501 indicates that a header area is to be formatted. An <xsl:element name="header"> tag 502 indicates that an object to be formatted is the header area. An <xsl:element name="report.string"> tag 503 indicates that a character string is to be written in the header area. An <xsl:attribute name="x">100</xsl:attribute> tag 504 and an <xsl:attribute name="y">100</xsl:attribute> tag 505 respectively indicate a start point (mm) of the character string to be written in the header area. An <xsl:value-of select="name"/> tag 506 indicates the character string to be written in the header area. Specifically, the <xsl:value-of select="name"/> tag 506 indicates that the character string "XXXXX report" corresponding to "name" is acquired from the report information 300 shown in FIG. 3, and output. A </xsl:element> tag 507 indicates the end of the character string to be written in the header area.

An <xsl:element name="report.string"> tag 508 indicates that a character string is to be written in the header area. An <xsl:attribute name="x">2000</xsl:attribute> tag 509 and an <xsl:attribute name="y">500</xsl:attribute> tag 510 respectively indicate a start point (mm) of the character string to be written in the header area. An <xsl:attribute name="output">date</xsl:attribute> tag 511 indicates the character string to be written in the header area. Specifically, the <xsl:attribute name="output">date</xsl:attribute> tag 511 indicates that today's date "2007/11/11" is acquired from the RTC 110, and output. A </xsl:element> tag 512 indicates the end of the character string to be written in the header area. A </xsl:element> tag 513 indicates the end of the header area as an object to be formatted. A </xsl:template> tag 514 indicates the end of the formatting of the header area.

The report filter 209 exchanges a message with the report activity 204. Furthermore, in response to a message from the report activity 204, the report filter 209 analyzes the report transmitted from the PC document receive filter 205, the FAX document receive filter 206, the read filter 207, and the readout filter 208, and draws an image of the report in the memory 105.

FIG. 8 is an explanatory diagram of an example of the image of a report 800 drawn in the memory 105 based on the analysis of the report including the report information 300, the report format 400, and the common format 500 shown in FIGS. 3 to 5. In the report 800 shown in FIG. 8, the character string "XXXXX report" (reference numeral 801), the character string "2007/11/11" (reference numeral 802), the character string "equipment status" (reference numeral 803), and the character string "error" (reference numeral 804) are written in accordance with a layout indicated by the report format 400 shown in FIG. 4 and the common format 500 shown in FIG. 5. Furthermore, a box 805 is drawn in the report 800 in accordance with the report format 400 shown in FIG. 4.

Figure 9:
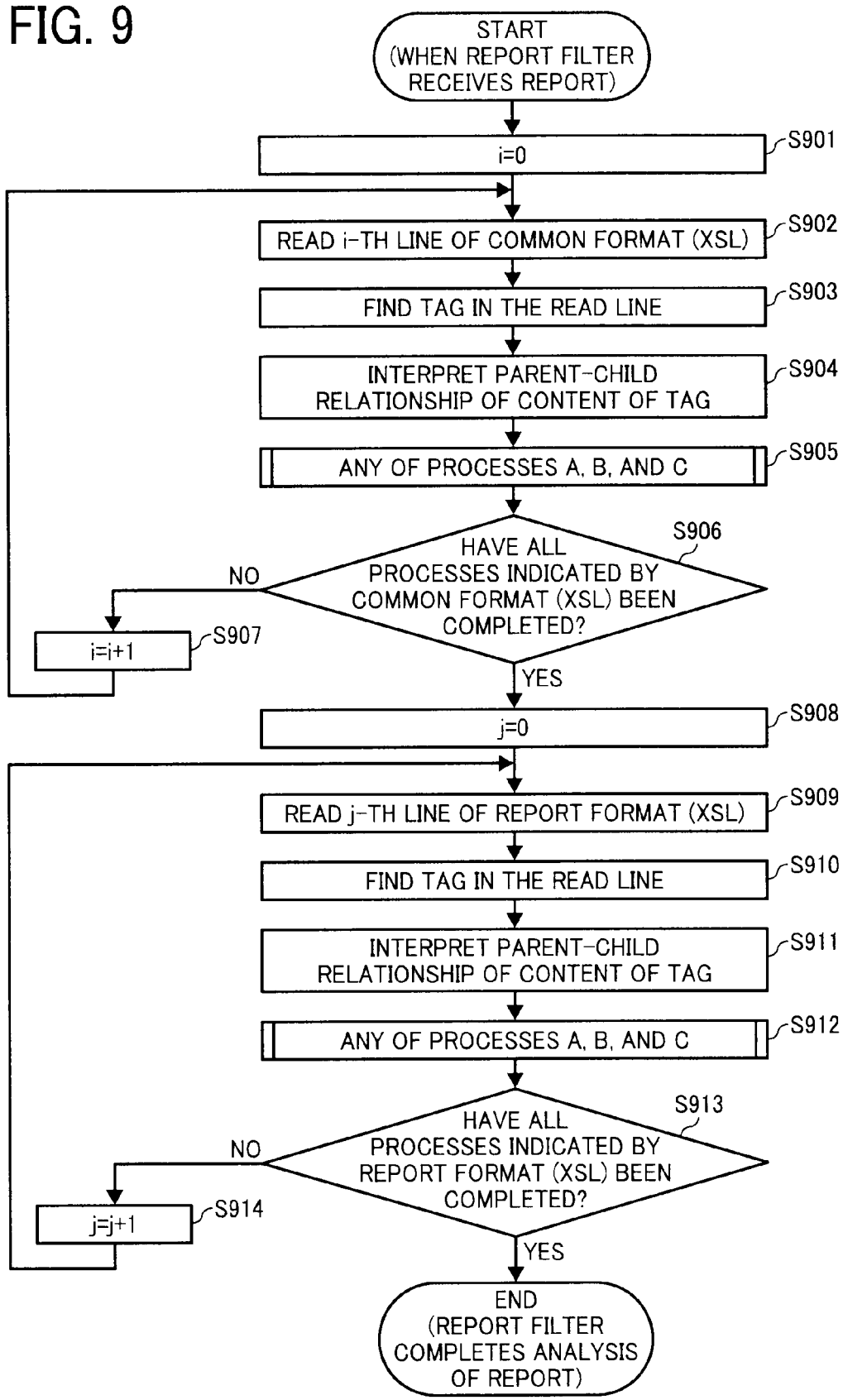
FIG. 9 is a flowchart of a report analyzing process performed by a report filter shown in FIG. 2.
Figure 10:
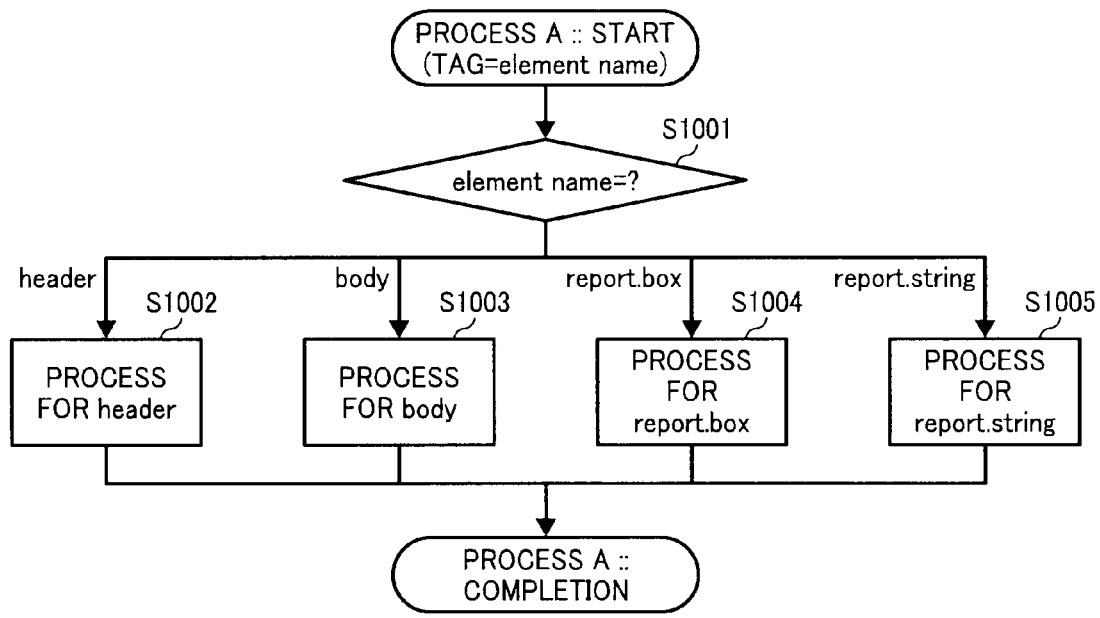
FIGS. 10 to 12 are flowcharts of processes executed at Step S912 shown in FIG. 9 depending on a tag included in the report.
Figure 11:
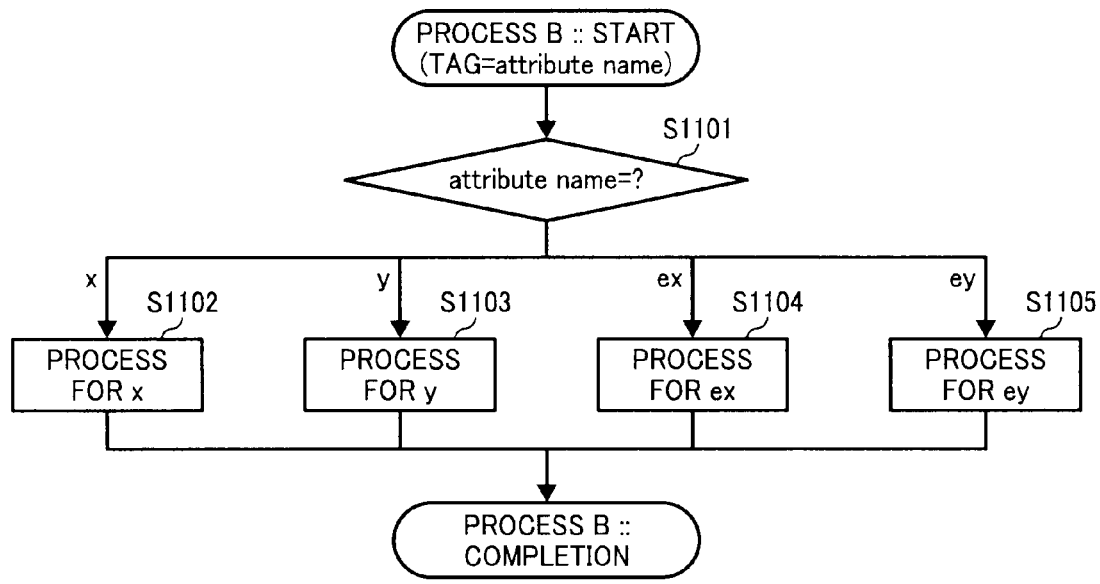
Figure 12:
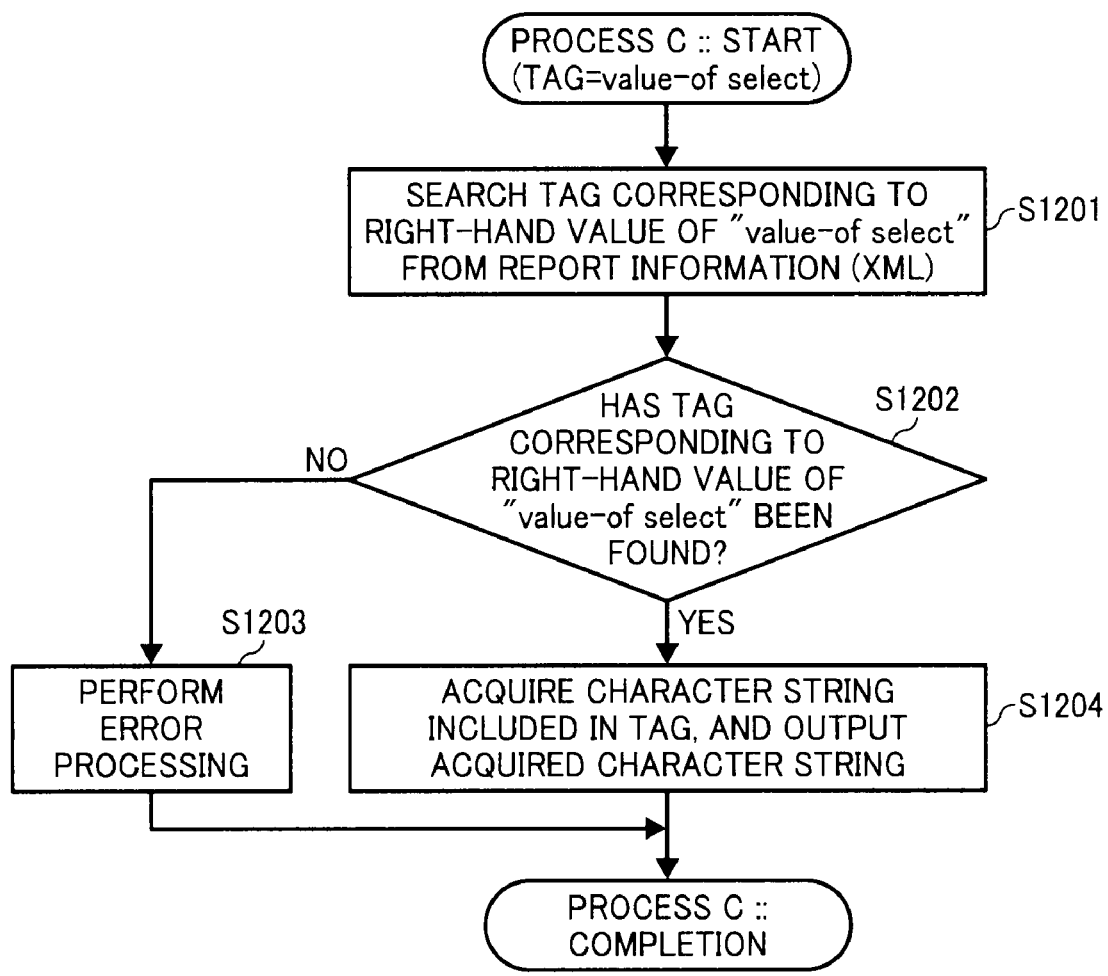

How the report filter 209 analyzes the report including the report information 300, the report format 400, and the common format 500 shown in FIGS. 3 to 5 is explained below with reference to FIGS. 9 to 12. FIG. 9 is a flowchart of a report analyzing process performed by the report filter 209. FIGS. 10 to 12 are flowcharts of processes executed at Step S912 shown in FIG. 9 depending on a tag included in the report.

Upon receiving a report from the report activity 204, the report filter 209 first resets a variable i stored in a register (i=0) (Step S901). The variable i indicates a line number of the common format 500 included in the report.

Then, the report filter 209 reads the i-th line of the common format 500 (Step S902). The report filter 209 finds a tag included in the read line (Step S903). The report filter 209 interprets a parent-child relationship of the tag included in the read line (Step S904). Specifically, the report filter 209 interprets whether the tag included in the read line includes any of "element name", "attribute name", and "value-of select".

The report filter 209 executes a process depending on the tag included in the read line (any of a process A, a process B, and a process C) (Step S905). Specifically, when the tag included in the read line includes "element name", the report filter 209 executes the process A. When the tag included in the read line includes "attribute name", the report filter 209 executes the process B. When the tag included in the read line includes "value-of select", the report filter 209 executes the process C.

When the process depending on the tag included in the read line is executed, the report filter 209 determines whether all processes indicated by the common format 500 have been completed (Step S906). When all the processes indicated by the common format 500 have not been completed (NO at Step S906), the report filter 209 increments the variable i stored in the register by one (i=i+1) (Step S907), and the system control returns to Step S902.

On the other hand, when all the processes indicated by the common format 500 have been completed (YES at Step S906), the report filter 209 resets a variable j stored in the register (j=0) (Step S908). The variable j indicates a line number of the report format 400 included in the report.

Then, the report filter 209 reads the j-th line of the report format 400 (Step S909). The report filter 209 finds a tag included in the read line (Step S910). The report filter 209 interprets a parent-child relationship of the tag included in the read line (Step S911). Specifically, the report filter 209 interprets whether the tag included in the read line includes any of "element name", "attribute name", and "value-of select".

The report filter 209 executes a process depending on the tag included in the read line (any of the process A, the process B, and the process C) (Step S912). Specifically, when the tag included in the read line includes "element name", the report filter 209 executes the process A. When the tag included in the read line includes "attribute name", the report filter 209 executes the process B. When the tag included in the read line includes "value-of select", the report filter 209 executes the process C.

After completing execution of the process depending on the tag included in the read line, the report filter 209 determines whether all processes indicated by the report format 400 have been completed (Step S913). When all the processes indicated by the report format 400 have not been completed (NO at Step S913), the report filter 209 increments the variable j stored in the register by one (j=j+1) (Step S914), and the system control returns to Step S909. On the other hand, when all the processes indicated by the report format 400 have been completed (YES at Step S913), the report filter 209 terminates the report analyzing process.

Contents of the process A, the process B, and the process C are explained below with reference to FIGS. 10 to 12.

First, the content of the process A is explained below with reference to FIG. 10. The report filter 209 specifies which of "header", "body", "report.box", and "report.string" is a right-hand value of "element name" in the tag included in the read line (Step S1001). When the right-hand value of "element name" is "header", the report filter 209 performs a process for the header, i.e., a process with respect to the header area (Step S1002). When the right-hand value of "element name" is "body", the report filter 209 performs a process for the body, i.e., a process with respect to the body area (Step S1003). When the right-hand value of "element name" is "report.box", the report filter 209 performs a process for report.box, i.e., a process of drawing a box (Step S1004). When the right-hand value of "element name" is "report.string", the report filter 209 performs a process for report.string, i.e., a process of writing a character string (Step S1005). Next, the content of the process B is explained below with reference to FIG. 11. The report filter 209 specifies which of "x", "y", "ex", and "ey" is a right-hand value of "attribute name" in the tag included in the read line (Step S1101). When the right-hand value of "attribute name" is "x", the report filter 209 performs a process for x, i.e., writes a character string or draws a box from a start point indicated by "x" (Step S1102). When the right-hand value of "attribute name" is "y", the report filter 209 performs a process for y, i.e., writes a character string or draws a box from a start point indicated by "y" (Step S1103). When the right-hand value of "attribute name" is "ex", the report filter 209 performs a process for ex, i.e., draws a box up to an extreme point indicated by "ex" (Step S1104). When the right-hand value of "attribute name" is "ey", the report filter 209 performs a process for ey, i.e., draws a box up to an extreme point indicated by "ey" (Step S1105).

Then, the content of the process C is explained below with reference to FIG. 12. The report filter 209 first searches a tag corresponding to a right-hand value of "value-of select" in the tag included in the read line from the report information 300 (Step S1201). The report filter 209 determines whether there is a tag corresponding to the right-hand value of "value-of select" in the report information 300 (Step S1202). When there is no tag corresponding to the right-hand value of "value-of select" in the report information 300 (NO at Step S1202), the report filter 209 treats the tag included in the read line as an error (Step S1203). On the other hand, when there is a tag corresponding to the right-hand value of "value-of select" in the report information 300 (YES at Step S1202), the report filter 209 acquires a character string included in the tag corresponding to the right-hand value of "value-of select", and outputs the acquired character string to be listed on a report (Step S1204).

Furthermore, the report filter 209 changes a format of a report on each of the functions created by the PC document receive filter 205, the FAX document receive filter 206, the read filter 207, and the readout filter 208. In the present embodiment, the report filter 209 changes a format of an image of a report, which is drawn in the memory 105 in the process described above, depending on a condition for outputting the report.

The condition for outputting the report is a condition set in accordance with a specification input by a user via the operating unit 102, for example, the number of expendable supplies used when the report is output (for example, the number of sheets) and a time taken to output the report. In the present embodiment, a case is considered in which the report filter 209 changes a font size of the character string to be listed on the report so that the report can fits on one side of a sheet.

To fit the report on one side of a sheet is of special significance in a report printing process for the following reasons.

A report is "a print for equipment management, for example, for letting a user know equipment settings" rather than "a print that a user wants to output". Therefore, the user does not want to use sheets and expendable supplies such as toner as far as possible. Namely, the fewer sheets and expendable supplies used to print out the report, the happier the user is.

Furthermore, a report is printed when an image forming apparatus is assembled at the factory for an operation check. In other words, a manufacturer of the image forming apparatus determines that "the image forming apparatus is assembled properly if the image forming apparatus prints out the report without any problem". The manufacturer performs such an operation check with respect to all image forming apparatuses assembled at the factory. Therefore, the fewer number of sheets and expendable supplies used to print out the report, the better.

Specifically, the fewer number of sheets and expendable supplies used to print out the report, the lower cost. Furthermore, when the number of sheets used in a report printing process is small (for example, one), a burden of a step of "setting up the sheet(s)" is low. Moreover, it takes more time and effort to set up a plurality of sheets as compared to those of to set up one sheet. In addition, when a plurality of sheets are used in the report printing process, a time taken to print out the report increases in proportion to the number of sheets. Furthermore, the shorter time per step leads to the better productivity. Therefore, the fewer number of prints brings benefits to not only the user but also the manufacturer of the image forming apparatus.

For the above reasons, to fit the report on one side of a sheet is of special significance in the report printing process. However, some reports have difficulty being fitted on one side of a sheet in practice. For example, in a case of a report that is ten pages long, i.e., ten sheets in one-side printing, it is quite difficult to fit the report on one side of a sheet. Because if such a report is size-reduced or aggregated to be fitted on one side of a sheet, letters will be too small for a user to read a content of the report. Therefore, depending on a type of report, it is possible to print out a report on over a plurality of sheets. In this case, the report filter 209 changes a font size of a character string to be listed on the report so that the report can be fitted on the predetermined number of sheets. Incidentally, it can be configured that the system control unit 109 sets the number of sheets used in the report printing process in accordance with an instruction input by a user via the operating unit 102.

The process filter 210 processes a report whose format is changed by the report filter 209. In the present embodiment, the process filter 210 performs image processing, such as a rotation or an image synthesis, on a report whose format is changed by the report filter 209.

The print filter 211 causes the output unit 107 to output a report whose format is changed by the report filter 209 or a report processed by the process filter 210. In the present embodiment, the print filter 211 causes the output unit 107 to print out a report whose format is changed by the report filter 209 or a report processed by the process filter 210 on a recording medium such as a sheet.

Figure 13:
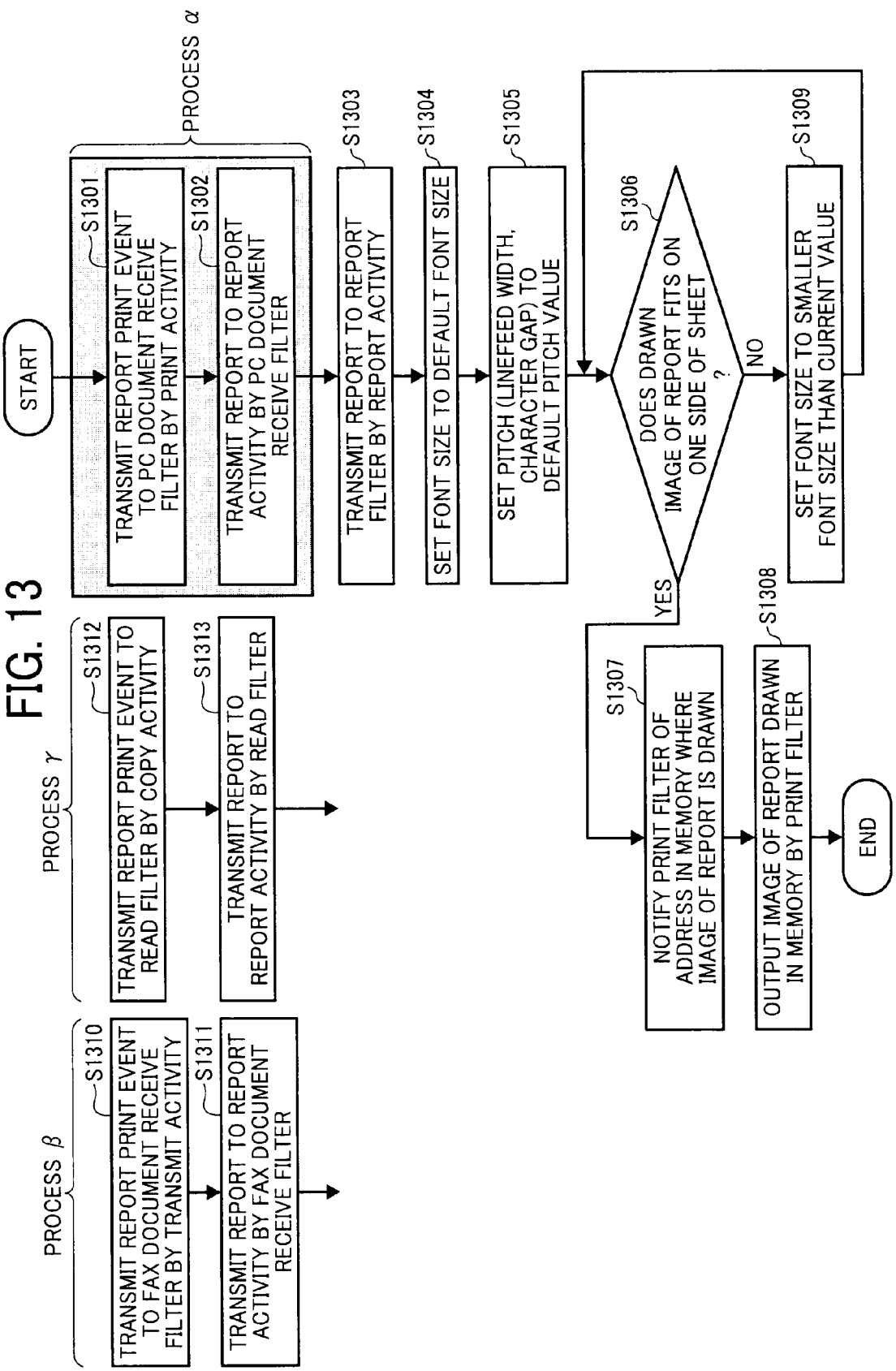
FIG. 13 is a flowchart of a report printing process performed by components shown in FIG. 2.

Subsequently, a report printing process performed by the components shown in FIG. 2 is explained below with reference to FIG. 13. FIG. 13 is a flowchart of the report printing process performed by the components.

First, when the operating unit 102 receives an input of a request for outputting a report, the print activity 201 transmits a message requesting a report printing process (hereinafter, "a report print event") to the PC document receive filter 205 (Step S1301). Upon receiving the report print event from the print activity 201, the PC document receive filter 205 creates a report, and transmits the created report to the report activity 204 (Step S1302). Incidentally, the processes at Steps S1301 and S1302 shall be referred to as a process a. Upon receiving the report from the PC document receive filter 205, the report activity 204 transmits the received report to the report filter 209 (Step S1303).

The report filter 209 sets a font size of a character string to be listed on the report to a default font size (Step S1304), and further sets a pitch (a linefeed width, a character gap) to a default value of the pitch (Step S1305). Incidentally, the set font size and the set value of the pitch shall be temporarily stored in the register. Then, the report filter 209 analyzes the report received from the PC document receive filter 205, and draws an image of the report in accordance with the font size and the value of the pitch, which are stored in the register, in the memory 105. The report filter 209 determines whether the drawn image of the report fits on one side of a sheet (Step S1306).

When determining that the drawn image of the report does not fit on one side of a sheet (NO at Step S1306), the report filter 209 sets the font size of the character string to a smaller font size than that is stored in the register (Step S1309). The report filter 209 repeatedly performs the processes at Step S1306 and S1309 until the drawn image of the report fits on one side of a sheet.

On the other hand, when determining that the drawn image of the report fits on one side of a sheet (YES at Step S1306), the report filter 209 notifies the print filter 211 of an address in the memory 105 where the image of the report is drawn (Step S1307). The print filter 211 outputs the image of the report drawn in a portion of the memory 105 corresponding to the address notified by the report filter 209 (Step S1308).

Incidentally, in the present embodiment, as described above, the report filter 209 changes a format of a report (a font size of a character string to be listed on the report, in the above example) based on the report transmitted from the PC document receive filter 205 through in the process α. Alternatively, the report filter 209 can change a format of a report based on a report received through a process β (Steps S1310 and S1311) or a process γ (Steps S1312 and S1313). In the process β, the transmit activity 202 transmits a report print event to the FAX document receive filter 206 (Step S1310). Upon receiving the report print event from the transmit activity 202, the FAX document receive filter 206 creates a report, and transmits the created report to the report activity 204 (Step S1311). In the process γ, the copy activity 203 transmits a report print event to the read filter 207 (Step S1312). Upon receiving the report print event from the copy activity 203, the read filter 207 creates a report, and transmits the created report to the report activity 204 (Step S1313).

Figure 14:
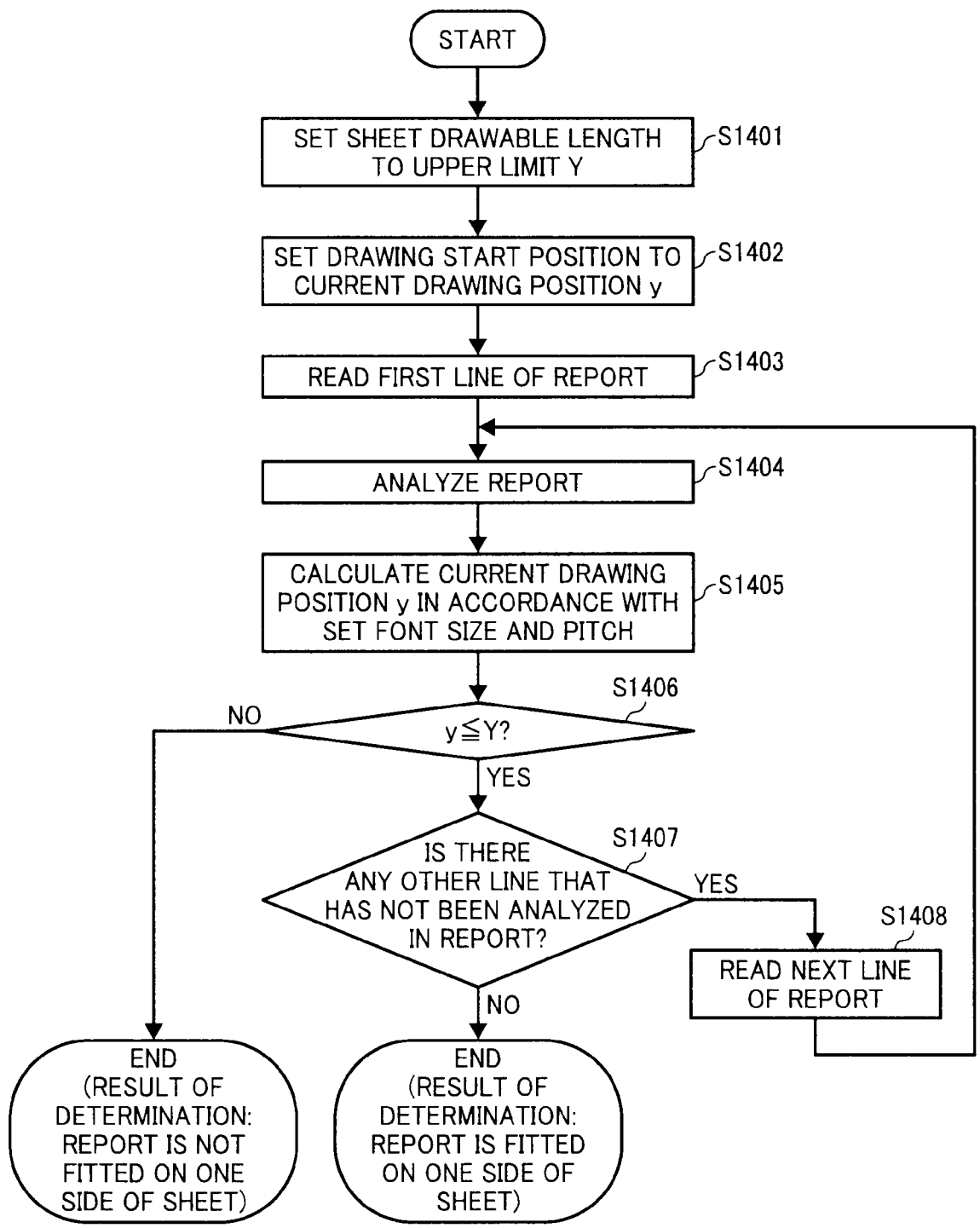
FIG. 14 is a flowchart of a process of determining whether an image of a report fits on one side of a sheet.

Subsequently, how the report filter 209 determines whether an image of a report fits on one side of a sheet is explained below with reference to FIG. 14. FIG. 14 is a flowchart of a process of determining whether an image of a report fits on one side of a sheet.

The report filter 209 sets a drawable length on one side of a sheet (a document size) to an upper limit Y (Step S1401). Incidentally, in the present embodiment, the set upper limit Y shall be temporarily stored in the register. The report filter 209 then sets a start position of drawing a report on the sheet to a current drawing position y (Step S1402). Specifically, when drawing of the report is not started, the report filter 209 sets y=0. Incidentally, the drawing position y shall be also temporarily stored in the register as well as the upper limit Y.

The report filter 209 reads the first line of the report in accordance with the process shown in FIG. 9 (Step S1403), and analyzes the report (Step S1404). Specifically, the report filter 209 draws an image of the report created in accordance with the process shown in FIG. 9 in the memory 105.

After drawing the image of the report in the memory 105, the report filter 209 calculates a position (a current drawing position y) of the report on the sheet if the image of the report drawn in the memory 105 is printed on the sheet in accordance with the font size set at Step S1304 and the pitch set at Step S1305 shown in FIG. 13 (Step S1405). Then, the report filter 209 determines whether the calculated drawing position y is equal to or smaller than the upper limit Y (Step S1406). When determining that the calculated drawing position y is larger than the upper limit Y (NO at Step S1406), the report filter 209 determines that the image of the report does not fit on one side of a sheet.

On the other hand, when determining that the calculated drawing position y is equal to or smaller than the upper limit Y (YES at Step S1406), the report filter 209 further determines whether there is any other line that has not been analyzed, i.e., a next line in the report (Step S1407). When there is a next line that has not been analyzed in the report (YES at Step S1407), the report filter 209 reads the next line of the report in accordance with the process shown in FIG. 9 (Step S1408). The report filter 209 repeatedly performs the processes at Steps S1404 to S1408 until all lines included in the report have been analyzed. On the other hand, when determining that there is no line that has not been analyzed in the report (NO at Step S1407), the report filter 209 determines that the image of the report fits on one side of a sheet.

In this manner, in the MFP 100 according to the first embodiment, the PC document receive filter 205, the FAX document receive filter 206, the read filter 207, and the readout filter 208 create a report on each of the functions in a format common to the functions, and the report filter 209 changes the format of the created report (for example, changes a font size of a character string to be listed on the report). Therefore, for example, when a setting for a report output process is changed, it is not necessary to change the setting with respect to each of the functions. Thus, it is possible to reduce development man-hours for the report output process.

In the MFP 100 according to the first embodiment, when it is determined that an image of a report does not fit on one side of a sheet, a font size of a character string is changed to a smaller font size. In a second embodiment, in such a case, a pitch of a character string is changed to a smaller pitch. Incidentally, a configuration of an MFP 2000 according to the second embodiment and a configuration of functions realized by a setting management unit, a system control unit, and an output control unit of the MFP 2000 are almost identical to those of the MFP 100 in the first embodiment. The portions identical to those shown in FIGS. 1 and 2 in the first embodiment are denoted with the same reference numerals, and the description of those portions is omitted.

In the present embodiment, the report filter 209 shall change a pitch of a character string to be listed on a report so that the report can fit on one side of a sheet (or the predetermined number of sheets). In this example, the pitch of the character string indicates a linefeed width of the character string, a distance between characters, i.e., a character gap, and the like.

Figure 15:
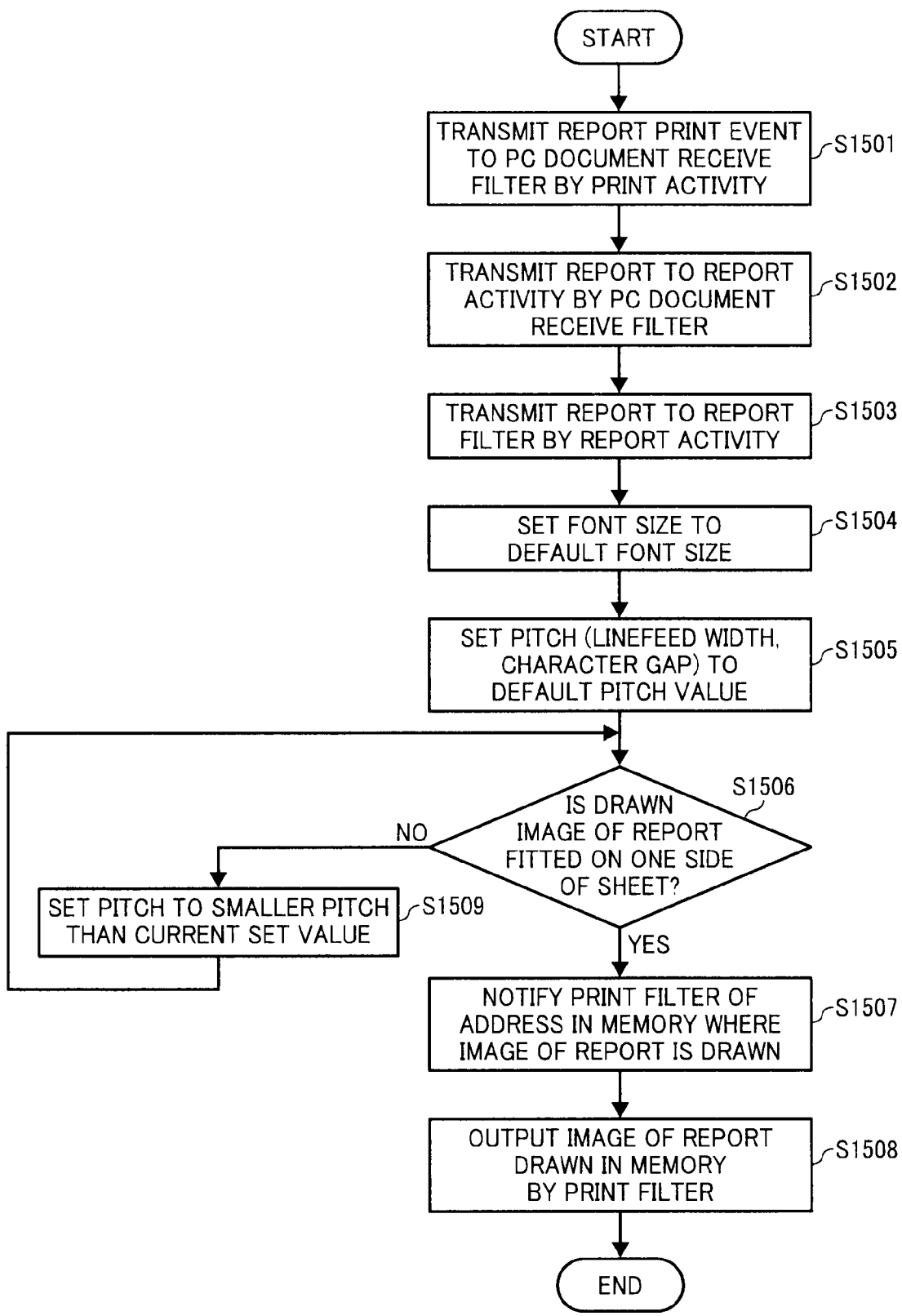
FIG. 15 is a flowchart of a report printing process performed by components of an MFP according to a second embodiment of the present invention.

A report printing process performed by components of the MFP 2000 is explained below with reference to FIG. 15. FIG. 15 is a flowchart of the report printing process performed by the components of the MFP 2000 (see FIG. 2). Incidentally, processes at Steps S1501 to S1508 are identical to the processes at Steps S1301 to S1308 shown in FIG. 13 in the first embodiment, and the description of these Steps is omitted.

When determining that the drawn image of the report does not fit on one side of a sheet (NO at Step S1506), the report filter 209 sets the pitch of the character string to a smaller pitch than that is stored in the register (Step S1509). The report filter 209 repeatedly performs the processes at Steps S1506 and S1509 until the drawn image of the report fits on one side of a sheet.

In this manner, in the MFP 2000 according to the second embodiment, in the same manner as in the first embodiment, the PC document receive filter 205, the FAX document receive filter 206, the read filter 207, and the readout filter 208 create a report on each of the functions in a format common to the functions, and the report filter 209 changes the format of the created report (for example, changes a pitch of a character string to be listed on the report). Therefore, for example, when a setting for a report output process is changed, it is not necessary to change the setting with respect to each of the functions. Thus, it is possible to reduce development man-hours for the report output process.

In the MFP according to the first and second embodiments, when it is determined that an image of a report does not fit on one side of a sheet, a pitch or a font size of a character string is changed to the smaller one. In a third embodiment of the present invention, in such a case, the image of the report is aggregated or size-reduced, and the aggregated or size-reduced image of the report is printed out on one side of a sheet. Incidentally, a configuration of an MFP 3000 according to the third embodiment and a configuration of functions realized by a setting management unit, a system control unit, and an output control unit of the MFP 3000 are almost identical to those of the MFP 100 in the first embodiment. The portions identical to those shown in FIGS. 1 and 2 in the first embodiment are denoted with the same reference numerals, and the description of those portions is omitted.

In the third embodiment, when a report is does not fit on one side of a sheet (or the predetermined number of sheets), the process filter 210 reduces a size of the report so that the report fits on one side of a sheet. Incidentally, only when a report received from the report filter 209 does not fit on one side of a sheet, the process filter 210 reduces the size of the report.

Alternatively, when a report does not fit on one side of a sheet (or the predetermined number of sheets), the process filter 210 can aggregate the report so that the report fits on one side of a sheet. In the third embodiment, only when a report received from the report filter 209 does not fit on one side of a sheet, the process filter 210 aggregates the report.

The print filter 211 receives the report after being subjected to the size-reduction or aggregation from the process filter 210, and causes the output unit 107 to output the received report.

Figure 16:
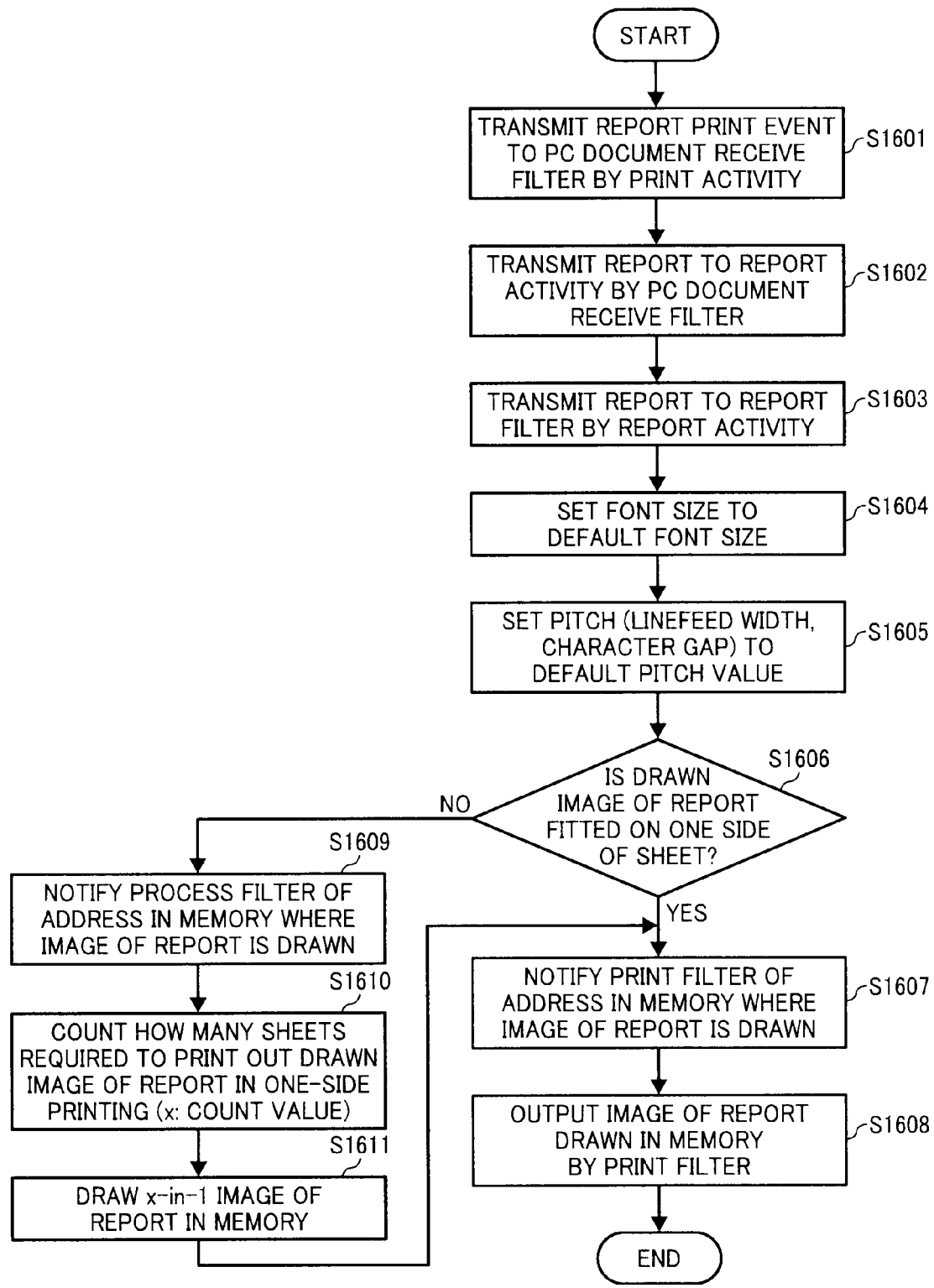
FIG. 16 is a flowchart of a report printing process performed by components of an MFP according to a third embodiment of the present invention.

A report printing process performed by components of the MFP 3000 is explained below with reference to FIG. 16. FIG. 16 is a flowchart of the report printing process performed by the components of the MFP 3000 (see FIG. 2). Incidentally, processes at Steps S1601 to S1608 are identical to the processes at Steps S1301 to S1308 shown in FIG. 13 in the first embodiment, and the description of these Steps is omitted.

When determining that the drawn image of the report does not fit on one side of a sheet (NO at Step S1606), the report filter 209 notifies the process filter 210 of an address in the memory 105 where the image of the report is drawn (Step S1609).

The process filter 210 counts how many sheets required to print out the image of the report drawn in the memory 105 in one-side printing (Step S1610). In this example, a count value obtained by the process filter 210 is denoted by x. The process filter 210 draws an x-in-1 image of the report that the image of the report drawn in the memory 105 corresponding to x numbers of sheets is aggregated into an image of the report corresponding to one sheet in the memory 105 (Step S1611). Then, the process filter 210 notifies the print filter 211 of an address in the memory 105 where the x-in-1 image of the report is drawn (Step S1607). Incidentally, when such an image aggregation is allowed only if x is an even number excluding multiples of 3, the count value (x) is set to a value equal to or larger than x (however, the newly-set value has to be an even number excluding multiples of 3), and an image of the report drawn in the memory 105 is aggregated with the newly-set value of x.

After that, the print filter 211 outputs the x-in-1 image of the report drawn in the memory 105 (Step S1608).

In this manner, in the MFP 3000 according to the third embodiment, in the same manner as in the first and second embodiments, the PC document receive filter 205, the FAX document receive filter 206, the read filter 207, and the readout filter 208 create a report on each of the functions in a format common to the functions, and the report filter 209 changes the format of the created report (for example, reduces a size of the report or aggregates the report). Therefore, for example, when a setting for a report output process is changed, it is not necessary to change the setting with respect to each of the functions. Thus, it is possible to reduce development man-hours for the report output process.

In the MFP according to the first to third embodiments, when it is determined that an image of a report does not fit on one side of a sheet, a pitch or a font size of a character string is changed to the smaller one, or the image of the report is size-reduced/aggregated. In a fourth embodiment of the present invention, in such a case, the image of the report is printed on both sides of a sheet, i.e., in duplex printing. Incidentally, a configuration of an MFP 4000 according to the fourth embodiment and a configuration of functions realized by a setting management unit, a system control unit, and an output control unit of the MFP 4000 are almost identical to those of the MFP 100 in the first embodiment. The portions identical to those shown in FIGS. 1 and 2 in the first embodiment are denoted with the same reference numerals, and the description of those portions is omitted.

When a report does not fit on one side of a sheet (or the predetermined number of sheets), the print filter 211 outputs the report in the duplex printing. In the present embodiment, only when a report received from the report filter 209 does not fit on one side of a sheet, the print filter 211 outputs the report in the duplex printing.

A report printing process performed by components of the MFP 4000 is explained below with reference to FIG. 17. FIG. 17 is a flowchart of the report printing process performed by the components of the MFP 4000 (see FIG. 2). Incidentally, processes at Steps S1701 to S1708 are identical to the processes at Steps S1301 to S1308 shown in FIG. 13 in the first embodiment, and the description of these Steps is omitted.

When determining that the drawn image of the report does not fit on one side of a sheet (NO at Step S1706), the report filter 209 notifies the print filter 211 of an address in the memory 105 where the image of the report is drawn (Step S1709).

The print filter 211 prints out the image of the report drawn in a portion of the memory 105 corresponding to the address notified by the report filter 209 in the duplex printing (Step S1710).

In this manner, in the MFP 4000 according to the fourth embodiment, in the same manner as in the first to third embodiments, the PC document receive filter 205, the FAX document receive filter 206, the read filter 207, and the readout filter 208 create a report on each of the functions in a format common to the functions, and the report filter 209 changes the format of the created report (for example, changes to print out the report in the duplex printing). Therefore, for example, when a setting for a report output process is changed, it is not necessary to change the setting with respect to each of the functions. Thus, it is possible to reduce development man-hours for the report output process.

In the MFPs according the first to fourth embodiments, a character string included in report information is listed on a report without change. In a fifth embodiment of the present invention, a created report shall include identification information of a character string to be listed on the report and information for identifying a language of the character string. Incidentally, a configuration of an MFP 5000 according to the fifth embodiment and a configuration of functions realized by a setting management unit, a system control unit, and an output control unit of the MFP 5000 are almost identical to those of the MFP 100 in the first embodiment. The portions identical to those shown in FIGS. 1 and 2 in the first embodiment are denoted with the same reference numerals, and the description of those portions is omitted.

In the fifth embodiment, the memory 105 shall store therein a character string to be listed on a report and identification information of the character string in an associated manner. FIG. 18 is a schematic diagram of an example of an output language file. As shown in FIG. 18, in this example, the output language file includes a language identification (ID) (for example, ID_1, ID_2, . . . ) and a content of a character string in each language (for example, Japanese, English, French, Russian, and the like) in an associated manner.

The PC document receive filter 205, the FAX document receive filter 206, the read filter 207, and the readout filter 208 create a report including a language ID.

Details of report information on a report to be created are explained below with reference to FIG. 19. FIG. 19 is an explanatory diagram of an example of report information 1900. The report information 1900 includes identification information of a character string to be listed on a report. An <output_lang=JAPANESE> tag 1901 indicates a language of the character string to be listed on the report. A <name>ID_7</name> tag 1902, a <status-label>ID_77</status-label> tag 1903, and a <status>ID_777</status> tag 1904 indicate identification information of the character string to be listed on the report.

The report filter 209 changes the created report to a report including a character string stored in the memory 105 in association with the language ID included in the created report.

Figure 20:
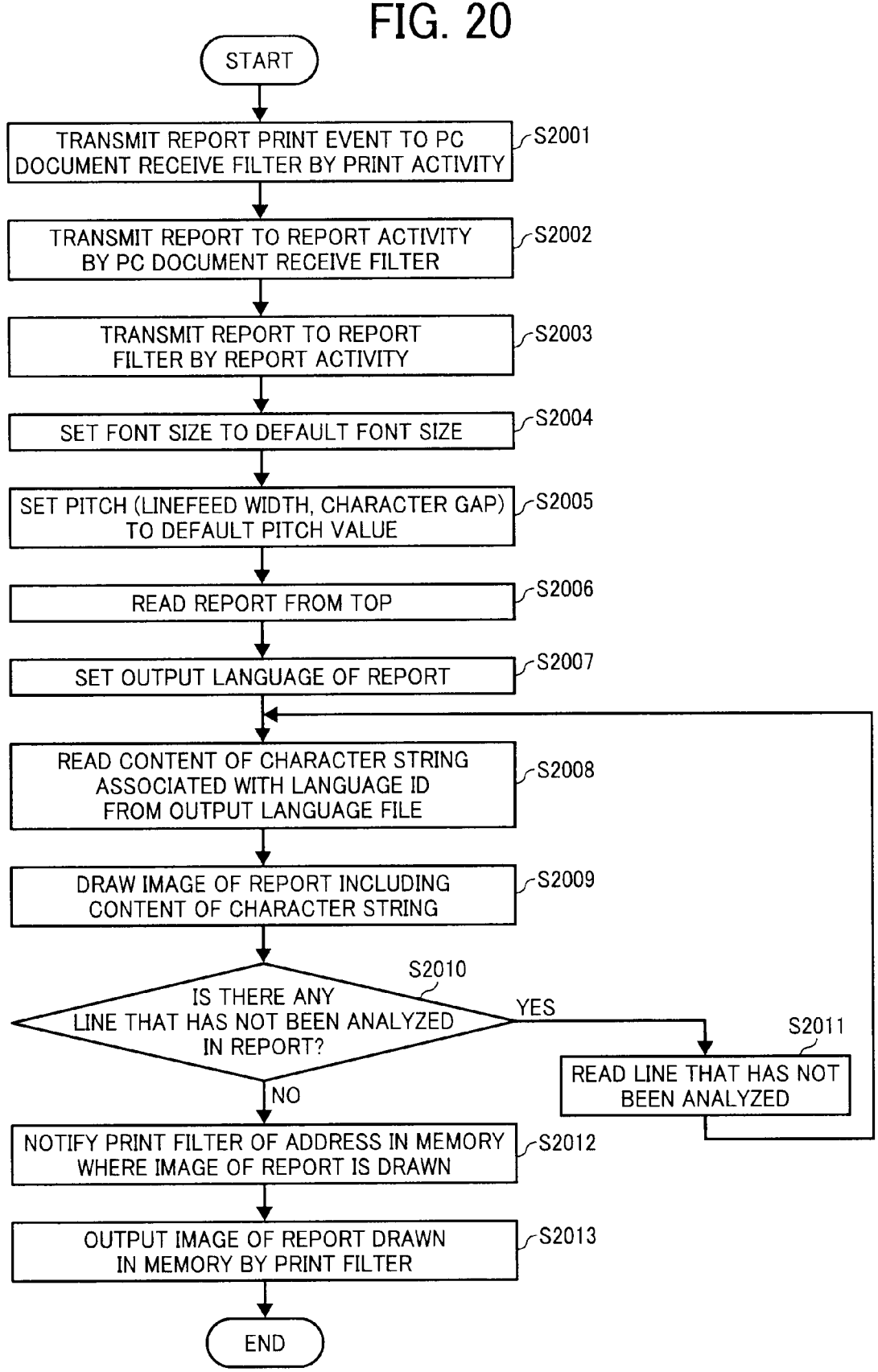
FIG. 20 is a flowchart of a report printing process performed by components of an MFP according to a fifth embodiment of the present invention.

A report printing process performed by components of the MFP 5000 is explained below with reference to FIG. 20. FIG. 20 is a flowchart of the report printing process performed by the components of the MFP 5000 (see FIG. 2). Incidentally, processes at Steps S2001 to S2005 are identical to the processes at Steps S1301 to S1305 shown in FIG. 13 in the first embodiment, and the description of these Steps is omitted.

The report filter 209 reads a report (Step S2006), and sets a language of the report to be output (hereinafter, "an output language") (for example, Japanese) in accordance with the <output_lang=JAPANESE> tag 1901 included in the report information 1900 (Step S2007). Incidentally, in the present embodiment, the set language shall be stored in the register.

When the report information 1900 includes identification information (a language ID) of a character string to be listed on the report, the report filter 209 reads a content of a character string associated with the language ID and the language set at Step S2007 from the output language file that is stored in the memory 105 in advance (Step S2008).

Then, the report filter 209 changes the created report to a report including the content of the character string read at Step S2008, and draws an image of the changed report in the memory 105 (Step S2009).

After that, the report filter 209 determines whether there is an un-analyzed line in the report (Step S2010). When there is a line that has not been analyzed in the report (YES at Step S2010), the report filter 209 reads the line that has not been analyzed in the report (Step S2011). The report filter 209 repeatedly performs the processes at Steps S2008 to S2011 until the whole report has been analyzed.

On the other hand, when there is no line that has not been analyzed in the report (NO at Step S2010), the report filter 209 notifies the print filter 211 of an address in the memory 105 where the image of the report is drawn (Step S2012). The print filter 211 outputs the image of the report drawn in a portion of the memory 105 corresponding to the address notified by the report filter 209 (Step S2013).

In a conventional technology, a language file of a character string to be listed on a report is stored in a storage medium included in each of functions, such as a copier function, a FAX function, a scanner function, and a printer function. Therefore, a portion of each of the storage media is occupied by the language file including overlapping character strings. Furthermore, when a content of a character string to be listed on a report is changed, it is necessary to change all the language files provided with respect to each of the functions. Therefore, it takes a lot of time and effort to change the content of the report. Moreover, when the content of the character string is changed, administrators who are allowed to change the language files provided with respect to each of the functions have to agree to the changed content of the character string with one another. Otherwise, for example, a character string supposed to indicate the same menu or the like is expressed by different character strings among the functions, which results in a confusion in a user.

Furthermore, when an output language of a character string to be listed on a report is added, it is necessary to add a character string in the added language into all the language files provided with respect to each of the functions. In addition, a rate of each of the storage media occupied by the language file disadvantageously increases. Furthermore, the addition of the character string in the added language into all the language files provided with respect to each of the functions leads to an increase of development man-hours (time and effort).

However, in the MFP 5000 according to the fifth embodiment, the report filter 209 reads out identification information included in a created report, and changes the created report to a report including a character string in association with the read identification information based on the language file stored in the memory 105. Therefore, it is possible to prevent language files with respect to each of the functions from including overlapping character strings, and thus a portion of the memory 105 occupied by the language files can be reduced. Furthermore, when a content of a character string to be listed on a report is changed, the change is just made in any one of the language files stored in the memory 105. Therefore, it is possible to reduce development man-hours (time and effort), and also possible to prevent an occurrence of a problem that a character string supposed to indicate the same content is expressed by different character strings among the functions.

Moreover, when an output language of a character string to be listed on a report is added into the memory 105, a character string in the added language is just added into any one of the language files stored in the memory 105. Therefore, a portion of the storage media occupied by the language files can be minimized. In addition, the character string in the added language is just added into any one of the language files stored in the memory 105, so that it is possible to reduce development man-hours (time and effort).

According to an aspect of the present invention, when a format of a report is to be changed, it is possible to reduce development man-hours for a report output process.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image forming apparatus capable of outputting function information on each of a plurality of functions, the image forming apparatus comprising:
   a plurality of creating units that create the function information in a format common to the functions;
   a changing unit that changes the format of the function information created by one or more of the creating units; and
   an output unit that outputs the function information whose format is changed by the changing unit,
   wherein the output unit outputs the function information in duplex printing if the function information does not fit on predetermined number of sheets when the function information is printed out.

2. The image forming apparatus according to claim 1, further comprising a storage unit that stores therein a character string to be listed on the function information and identification information for identifying the character string in an associated manner, wherein
   the creating units create first function information including the identification information, and
   the changing unit changes the first function information to second function information including the character string stored in the storage unit in association with the identification information included in the first function information.

3. The image forming apparatus according to claim 2, wherein the changing unit changes a font size of the character string included in the second function information so that the second function information fits on predetermined number of sheets when the second function information is printed out.

4. The image forming apparatus according to claim 3, further comprising a setting unit that sets the predetermined number of sheets.

5. The image forming apparatus according to claim 2, wherein the changing unit changes a position of the character string included in the second function information so that the second function information fits on predetermined number of sheets when the second function information is printed out.

6. The image forming apparatus according to claim 5, further comprising a setting unit that sets the predetermined number of sheets.

7. The image forming apparatus according to claim 1, further comprising a reducing unit that reduces a size of the function information so that the function information fits on predetermined number of sheets when the function information is printed out.

8. The image forming apparatus according to claim 7, further comprising a setting unit that sets the predetermined number of sheets.

9. The image forming apparatus according to claim 1, further comprising an aggregating unit that aggregates the function information so that the function information fits on predetermined number of sheets when the function information is printed out.

10. The image forming apparatus according to claim 9, further comprising a setting unit that sets the predetermined number of sheets.

11. The image forming apparatus according to claim 1, further comprising a setting unit that sets the predetermined number of sheets.

12. An image forming method for causing an image forming apparatus to output function information on each of a plurality of functions, the image forming method comprising:
   creating the function information in a format common to the functions;

changing the format of the function information created at the creating; and outputting the function information whose format is changed at the changing, wherein the outputting outputs the function information in duplex printing if the function information does not fit on predetermined number of sheets when the function information is printed out.

13. The image forming apparatus according to claim 12, further comprising storing a character string to be listed on the function information and identification information for identifying the character string in a storage unit in an associated manner, wherein the creating includes creating first function information including the identification information, and the changing includes changing the first function information to second function information including the character string stored in the storage unit in association with the identification information included in the first function information.

14. A non-transitory computer-readable recording medium that stores therein a computer program which when executed on a computer causes the computer to output function information on each of a plurality of functions, the computer program causing the computer to execute:

creating the function information in a format common to the functions;

changing the format of the function information created at the creating; and outputting the function information whose format is changed at the changing, wherein the outputting outputs the function information in duplex printing if the function information does not fit on predetermined number of sheets when the function information is printed out.

15. The non-transitory computer-readable recording medium according to claim 14, wherein the computer program further causing the computer to execute storing a character string to be listed on the function information and identification information for identifying the character string in a storage unit in an associated manner, and the creating includes creating first function information including the identification information, and the changing includes changing the first function information to second function information including the character string stored in the storage unit in association with the identification information included in the first function information.

\* \* \* \* \*